Jan. 12, 1971     R. V. SARA     3,553,820
METHOD OF PRODUCING ALUMINUM-CARBON FIBER COMPOSITES
Original Filed Feb. 21, 1967
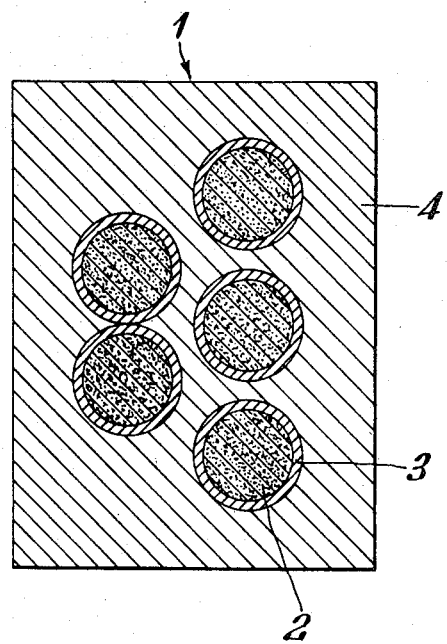
INVENTOR.
RAYMOND V. SARA
BY
ATTORNEY United States Patent Office 3,553,820
Patented Jan. 12, 1971

3,553,820
METHOD OF PRODUCING ALUMINUM-CARBON FIBER COMPOSITES
Raymond Vincent Sara, North Olmsted, Ohio, assignor to Union Carbide Corporation, New York, N.Y., a corporation of New York
Original application Feb. 21, 1967, Ser. No. 617,662, now Patent No. 3,473,900, dated Oct. 21, 1969. Divided and this application May 5, 1969, Ser. No. 821,848
Int. Cl. B23p *17/00*
U.S. Cl. 29—419         2 Claims

ABSTRACT OF THE DISCLOSURE

Light weight, strong composite refractory articles comprising a plurality of tantalum coated carbon fibers bonded together by an essentially aluminum matrix are provided. Such composite articles are characterized by a high modulus of elasticity and are especially suited as materials of construction for aerospace and hydrospace vehicles and systems.

CROSS-REFERENCE

This application is a division of copending application Ser. No. 617,662, filed Feb. 21, 1967, and now Pat. No. 3,473,900, granted Oct. 21, 1969.

BACKGROUND OF INVENTION

Field of the invention

The present invention relates to a composite refractory article which is made up of a plurality of high modulus, high strength carbon fibers which are completely coated with a thin layer of tantalum and bonded together by an aluminum matrix.

Description of the prior art

Recently, in the space and missile industries, there has developed a need for materials of construction which exhibit exceptional physical properties, for example, low density coupled with high strength and stiffness. Attempts to produce such materials have centered around the fabrication of composite articles.

One of the most promising materials available today for use in composite form is carbon textiles since they are available commercially in all known textile forms. Today, it is well known to form composites of carbon textiles and resins.

Recently, efforts have been directed to forming composites of carbon textiles and metals. The object of forming such composites is to increase the strength of the metal matrix by the inclusion therein of the high strength carbon fibers.

Aluminum has been suggested as the matrix media for carbon fiber-metal composites which are intended for use in aerospace applications, in the main, due to its low density. However, aluminum does not wet pure graphite for all practica purposes unless aluminum carbide is formed at the interface. Such an aluminum carbide phase cannot be tolerated due to its thermochemical instability.

In order to overcome the inherent lack of wettability of carbon fibers with aluminum, it was decided to try and coat carbon fibers with a thin metallic coating which then would be wetted by aluminum. However, most metals react extensively with aluminum above its metling temperature and form one or more brittle intermetallic phases. The intermetallic constituents or phases either degrade certain mechanical properties of the composite or result in dewetting of the aluminum from around the coated fibers. An extensive study was made of the interfacial zone formed between titanium, chromium, nickel, copper, columbium, silver, molybednum, tungsten and tantalum respectively, and aluminum to determine which metals are most compatible with aluminum and therefore most useful as intermediate phase-free coupling or wetting agents. Of all the metals tried only tantalum was found to be entirely satisfactory.

SUMMARY

Broadly stated, the carbon fiber-aluminum composite article of the invention comprises a plurality of carbon fibers each of which is coated with a thin layer of tantalum and bonded together, preferably in a side-by-side or parallel manner, with an aluminum binder or matrix. Generally, this composite article may be provided by a process which comprises coating carbon fibers with a thin but continuous film of tantalum, compacting the so-coated fibers into the desired form, infiltrating the voids between the compacted fibers with molten aluminum and cooling the resultant aluminum infiltrated tantalum coated carbon fibers to produce a composite article. This article can then be formed into any desired shape by known techniques which will readily suggest themselves to those skilled in the art.

DESCRIPTION OF THE DRAWING

The sole figure shown in the drawing presented herewith is a diagrammatical illustration of a rectangular carbon fiber-metal matrix composite article produced according to the teachings of the instant invention.

Referring now in detail to the drawing, there is shown in cross section a rectangular composite article 1 consisting of aligned graphite fibers 2 having disposed on their surface a continuous one to two micron thick coating of tantalum 3. These so-coated fibers are bonded together by an aluminum matrix 4. The graphite fibers 2 are approximately two inches in length and disposed in the aluminum matrix 4 in a parallel or side-by-side manner. The length dimension of the fibers 2 is perpendicular to surface of the drawing.

DESCRIPTION OF THE PREFERRED EMBODIMENT OF THE INVENTION

Carbon textiles in any form can be employed in the practice of the instant invention. However, it is preferred to employ carbon fibers in yarn or mono-filament form. Carbon textiles are available commercially and are generally produced by the techniques described in U.S. Pats. 3,107,152 and 3,116,975, among others.

Tantalum can be deposited on the carbon fibers by a variety of methods. The techniques available for accomplishing this include electrodeposition from a fused salt bath, thermal decomposition of the apropriate metal halide or sputtering. The exact deposition technique to be employed is dictated by a number of factors. Sputtering can be used on relatively complex shapes and results in a tenacious bond between the thin tantalum coating and the carbon fiber substrate. Such a bond is a highly desirable feature in carbon fiber-metal matrix composites. Thermal decomposition of the appropriate halide requires a heating of the carbon fiber substrate and, accordingly, somewhat limits the type of shapes which can be coated with tantalum in this manner. Electrodeposition of tantalum from a fused salt bath is an ideal way of coating carbon fibers with a thin film of tantalum but this technique is limited to rather simple carbon fiber configurations.

The following example illustrates in detail the preferred practice of the instant invention.

A carbon yarn material which had been heated to graphitizing temperatures was cut into 2-inch lengths. A tantalum coating averaging from 0.2 to 2.0 microns was electro-deposited on these fibers by a technique similar to that described in copending U.S. patent application Ser. No. 609,683 which has been assigned to the same assignee as the instant application. These tantalum clad fibers were then placed in an aligned position (all parallel) in a cylindrical capillary tube which was providde with a top and bottom closure. The surface of the cylinder was provided with randomly placed holes or openings to facilitate the ingress of aluminum into the cylinder and hence into the voids between the aligned carbon fibers. The cylinder containing the carbon fibers in a preselected form was placed into an air tight chamber which also contained a vessel of aluminum. The chamber was then evacuated to a pressure of approximately $2 \times 10^{-6}$ mm. of mercury to out gas the carbon fibers. The aluminum was heated to a temperature of approximately 700° C. The cylinder containing the aligned fibers was submerged below the surface of the molten aluminum. The chamber was then filled with argon gas to a pressure of about one atmosphere to insure that molten aluminum filled essentially all the voids between the aligned carbon fibers. After about thirty seconds of pressurizing the specimen, the capsule was withdrawn from the molten aluminum, cooled and removed from the chamber.

A metallographic examination of the resultant composite showed that aluminum readily wet the tantalum clad fibers and incorporated them into the matrix without disturbing the tantalum coating and, more importantly, without the formation of a reaction zone at the aluminum-tantalum interface.

Composites so-produced are extremely useful as materials of construction for subsonic and supersonic aircraft, space system components and various propulsion devices.

While the foregoing example concerns a composite where the fibers are positioned in a side-by-side relationship, it is readily apparent to those skilled in the art that the carbon fibers may be randomly orientated in the aluminum matrix if more isotropic physical properties are desired without losing the benefits of the instant invention. In addition, it is obvious that the thickness of the tantalum can be varied as desired. All that is required is that it be thick enough to prevent the aluminum matrix metal from coming into contact with the reinforcing carbon fibers. Likewise, it will be appreciated by those versed in the art that although graphite fibers and fabrics are preferred in the practice of the instant invention, nongraphitic carbon fibers and fabrics may also be employed. Also, other methods of infiltrating the tantalum clad carbon fibers with aluminum will readily suggest themselves to the skilled artisan.

The term carbon as used herein and in the appended claims is meant to include both nongraphitic and graphitic forms of carbon.

The foregoing example is presented for illustrative purposes only and is not intended to unduly limit the reasonable scope of the present invention. The limitations of applicant's invention are defined by the following claims.

What is claimed is:

1. A method of producing a tantalum clad carbon fiber-metal composite article comprising:
   (1) shaping a plurality of tantalum clad carbon fibers into a preselected form;
   (2) heating said fiber form in a partial vacuum to out gas said fibers;
   (3) submerging said out gased fiber form in molten metal;
   (4) applying a pressure to said molten metal to force said metal into the voids in said fiber form;
   (5) removing said fiber form from said molten metal to produce a tantalum clad carbon fiber-metal composite; and
   (6) cooling said resultant tantalum clad carbon fiber-metal composite.

2. The process of claim 1 wherein:
   (1) said fibers are tantalum clad graphite fibers in yarn form;
   (2) said graphite yarn fibers are positioned in a substantially side-by-side; parallel relationship; and
   (3) said molten metal is aluminum.

References Cited

UNITED STATES PATENTS

| | | | |
|---|---|---|---|
| 3,071,637 | 1/1963 | Horn et al. | |
| 3,085,317 | 4/1963 | Stackhouse | 29—183.5 |
| 3,098,723 | 7/1963 | Micks | 29—183.5 |
| 3,137,995 | 6/1964 | Othmer et al. | |
| 3,229,359 | 1/1966 | Kramer | 29—157 |
| 3,351,484 | 11/1967 | Gutzeit | 117—169X |
| 3,443,301 | 5/1969 | Basche et al. | 29—419 |

JOHN F. CAMPBELL, Primary Examiner

D. C. REILEY, Assistant Examiner

U.S. Cl. X.R.

29—157, 420, 527.2; 117—228